(12) United States Patent
Zhang et al.

(10) Patent No.: US 11,813,653 B2
(45) Date of Patent: Nov. 14, 2023

(54) METHOD FOR PREPARING LARGE-SIZE RARE EARTH MAGNESIUM ALLOY HIGH-PERFORMANCE INGOTS BY SHORT PROCESS SEVERE PLASTIC DEFORMATION

(71) Applicant: North University of China, Taiyuan (CN)

(72) Inventors: Zhimin Zhang, Taiyuan (CN); Jianmin Yu, Taiyuan (CN); Zhen Wang, Taiyuan (CN); Zhe Cheng, Taiyuan (CN); Mei Cheng, Taiyuan (CN)

(73) Assignee: North University of China, Taiyuan (CN)

( * ) Notice: Subject to any disclaimer, the term of this patent is extended or adjusted under 35 U.S.C. 154(b) by 0 days.

(21) Appl. No.: 17/944,218

(22) Filed: Sep. 14, 2022

(65) Prior Publication Data
US 2023/0321710 A1    Oct. 12, 2023

(30) Foreign Application Priority Data

Apr. 12, 2022   (CN) .......................... 202210379387.0

(51) Int. Cl.
*B21D 22/02*    (2006.01)
*C22F 1/06*    (2006.01)

(52) U.S. Cl.
CPC .............. *B21D 22/022* (2013.01); *C22F 1/06* (2013.01)

(58) Field of Classification Search
None
See application file for complete search history.

(56) References Cited

PUBLICATIONS

Jianmin Yu a, et al. "Deformation Behavior and Microstructure Evolution of Rare Earth Magnesium Alloy during Rotary Extrusion." Materials Letters, North-Holland, Jan. 20, 2020, https://www.sciencedirect.com/science/article/pii/S0167577X20300896. (Year: 2020).*

* cited by examiner

*Primary Examiner* — Anthony M Liang (57) ABSTRACT

The present disclosure discloses a method for preparing large-size rare earth magnesium alloy with high-performance ingots by short process severe plastic deformation. When in use, the pushing cylinder moves upward, and the back pressure plate is adjusted to the outlet of the extrusion deformation area. After the male mold stroke is completed, the recoverable discard block fills the extrusion deformation area, and the upsetting extrusion deformation is completed. Then, the pushing cylinder drives the back pressure plate to remove from the lower part of the lower mold cavity downward, and the recoverable discard block has been broken due to the high pressure. Then, the extruded blank and residual block powder are taken out from the lower part of the lower mold cavity, restored into a plate shape for the next use. The present disclosure can solve the tail shrinking phenomenon, save materials and increase the strengthening effect.

5 Claims, 8 Drawing Sheets

(Prior Art)

METHOD FOR PREPARING LARGE-SIZE RARE EARTH MAGNESIUM ALLOY HIGH-PERFORMANCE INGOTS BY SHORT PROCESS SEVERE PLASTIC DEFORMATION

FIELD OF THE INVENTION

The present disclosure relates to the technical field of metal plastic processing, in particular to a method for preparing large-size rare earth magnesium alloy high-performance ingots by short process severe plastic deformation.

BACKGROUND OF THE INVENTION

Figure 1:
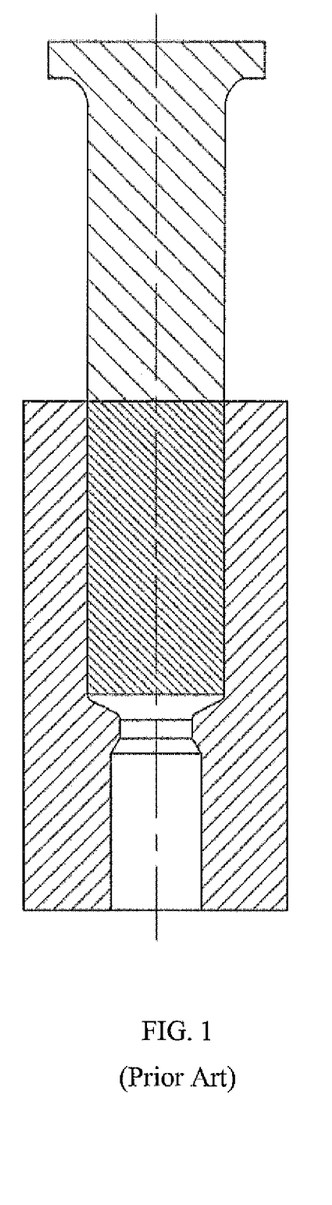
FIG. 1 is a structural diagram of the existing forward extrusion metal plastic deformation mold before forming.
Figure 2:
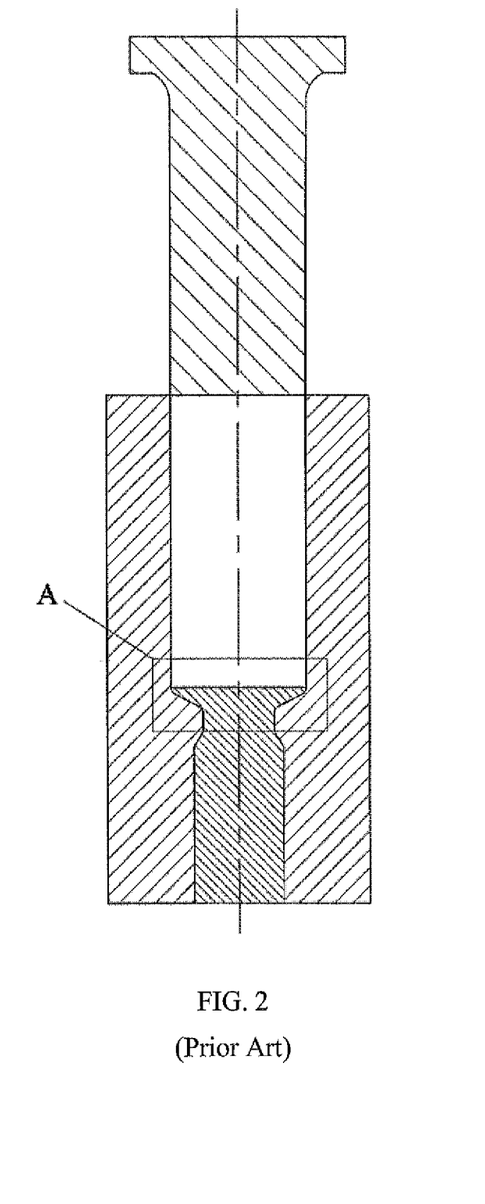
FIG. 2 is a structural diagram of the existing forward extrusion metal plastic deformation mold after forming (there are blank residual after pressing and tail shrinkage phenomena)

As shown in FIG. 1, in metal plastic deformation molds, traditional forward extrusion is the most basic extrusion method. Because of its high triaxial compressive stress, traditional forward extrusion can fully improve the plastic deformation ability of metal materials, which has the characteristics of simple process operation and great production flexibility, and is widely used. However, the following disadvantages still exist: (1) during extrusion, the metal flow is uneven, the metal flow is fast in the middle and is slow in the edge, as shown in position A in FIG. 2, resulting in tail shrinkage, which is not conducive to continuous extrusion. (2) There is a conical deformation zone in the extrusion mold, so that there is still discard after extrusion. The existence of discard and tail shrinkage makes it necessary to cut the head and tail after extrusion, resulting in material waste. (3) The existing large-size magnesium alloys are usually prepared by the process of "multiple heating, repeated extrusion and upsetting", that is, 1) heating homogenization—2) heating—3) extrusion—4) head and tail removal—5) heating—6) upsetting, and repeating the steps 2)-6) three times, a total of 16 processes, with a large cumulative total strain of 3-4, which has a certain strengthening and toughening effect. However, the gap of each upsetting and extrusion cycle in this process needs to be reheated. In addition to high energy consumption, each heating will weaken the strengthening effect and greatly reduce the strengthening effect. In addition, the gap of each upsetting and extrusion cycle requires the cutting of the discard, which has long working hours, low material utilization and low production efficiency, resulting in high comprehensive cost and limiting the application of mass production of magnesium alloys.

SUMMARY OF THE INVENTION

The object of the present disclosure is to provide a method for preparing large-size rare earth magnesium alloy high-performance ingots by short process severe plastic deformation, so that the blank in the extrusion process under the condition of back pressure is continuously upsetting, to achieve the preparation of large-size blank. And reusable recoverable discard blocks are used in the late extrusion, so as to solve the existence of discard in the traditional forward extrusion and the shrinkage tail phenomenon caused by the uneven flow of metal, which will save materials and shorten the process, so that the strengthening effect is increased, and the production time is greatly reduced.

In order to achieve the above object, the solution of the present disclosure is to provide a method for preparing large-size rare earth magnesium alloy high-performance ingots by short process severe plastic deformation, and the method includes the following steps:

S1: Providing cylindrical magnesium alloy bar;

S2: Homogenizing the cylindrical magnesium alloy bar as cylinder blank;

S3: Heating the cylinder blank to the forming temperature and holding the temperature, and heating the preparation mold, back pressure plate, pressing box and pressing block above the experimental temperature and holding the temperature for half an hour. The preparation mold includes a male mold installed on an upper workbench of a press machine, a female mold installed on a lower workbench of the press machine, a recoverable discard block and a back pressure plate connected with a pushing cylinder of the press machine. The female mold is provided with an upper mold cavity and a lower mold cavity, and an upper part of the upper mold cavity is configured for placing blanks, the recoverable discard block and the male mold, a lower part of the upper mold cavity is inclined inward to form an extrusion deformation area communicated with the lower mold cavity. The recoverable discard block is separated between the blank and the male mold, the recoverable discard block is made of deformable material, and the recoverable discard block can not only be deformed and filled in the extrusion deformation area, but also be deformed and restored. The upper part of the back pressure plate is fitted in the lower mold cavity, so that a molding cavity is formed between the upper part of the back pressure plate and the lower mold cavity, and the upper surface of the back pressure plate is raised in the middle.

S4: Installing the preparation mold after preheating and heat preservation on the pressing machine, and evenly spraying organic graphite lubricant on the male mold and the female mold;

S6: Putting the cylinder blank after homogenization and heat treatment into the upper mold cavity of the male mold;

S7: Placing the recoverable discard block above the cylinder blank;

S8: In the initial stage of extrusion forming, adjusting the height of the back pressure plate to the outlet of the extrusion deformation area by the upward movement of the pushing cylinder. First, the pressing machine drives the male mold to move downward and gradually extrudes the cylinder blank into the extrusion deformation area. The bottom of the cylinder blank slowly deforms, contracts and fills the extrusion deformation area. As the male mold continues to move downward, the bottom of the blank contacts the upper surface of the back pressure plate. When the contact width is close to the size of the extruded part, the back pressure plate starts its downward return with the male mold. After the stroke of the male mold is completed, the recoverable discard block fills the extrusion deformation area, and the upsetting deformation is completed. In this process, the back pressure plate always gives an upward back pressure to the blank;

S9: Then, driving the back pressure plate downward to remove from the lower part of the lower mold cavity by the pushing cylinder, and the recoverable discard block has been broken due to high pressure; taking out the extruded cylinder blank and the powder of the recoverable discard block from the lower part of the lower mold cavity, and restoring the powder into a plate shape for the next use.

Further, the recoverable discard block is in a molten state at high temperature; and the recoverable discard block is a brittle solid at low temperature, and is broken into solid powder when pressed in the extrusion deformation area.

Further, the recoverable discard block is made of a mixture of fluorite powder and graphite.

Further, the preparation mold includes an extrusion restoration mold, wherein the extrusion restoration mold includes a pressing box and a pressing block, the pressing box is provided with a groove, the recoverable discard block is crushed into solid powder under pressure and placed in the groove, and the pressing block presses the solid powder to restore the solid powder into recoverable discard block under high temperature.

Further, the male mold and the female mold are connected to the upper and lower workbenches through fasteners. The method also includes S10: after the work is completed, molding the male mold and the mold together to perform a mold closing action, then loosening the fasteners, and then removing the preparation mold.

After adopting the above solution, the advantageous effect of the present disclosure lies in:

In the extrusion process of the present disclosure, because the recoverable blank can gradually fill the extrusion deformation area with the movement of the mold, so that the cylinder blank can be completely extruded into the lower mold cavity, there is no blank problem in the final formed part. In addition, in the upsetting extrusion process, the surface uplift structure on the back pressure plate provides back pressure to make the deformation uniform, and at the same time, it can prevent the blank from tail shrinking, so that the formed part does not need to cut the head and tail again, which saves materials. The reuse of the recoverable blank is simple and environmentally friendly. Besides, the strain of the present disclosure increases in the whole process, which is conducive to increasing the strengthening effect, and provides a basis for the preparation of the severe deformation of magnesium alloy ingots. Further, it not only reduces the number of upsetting extrusion, but also reduces the cutting process, so as to improve the overall production efficiency and expands the application of mass production of magnesium alloy without tail shrinkage, back pressure and severe plastic deformation.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

In order to more clearly illustrate the embodiments of the present disclosure or the technical solutions in the prior art, the following will briefly introduce the drawings that need to be used in the description of the embodiments or the prior art. It is apparent that the drawings in the following description are only some embodiments of the present disclosure. For those skilled in the art, other drawings can be obtained from these drawings without paying creative labor.

Figure 3:
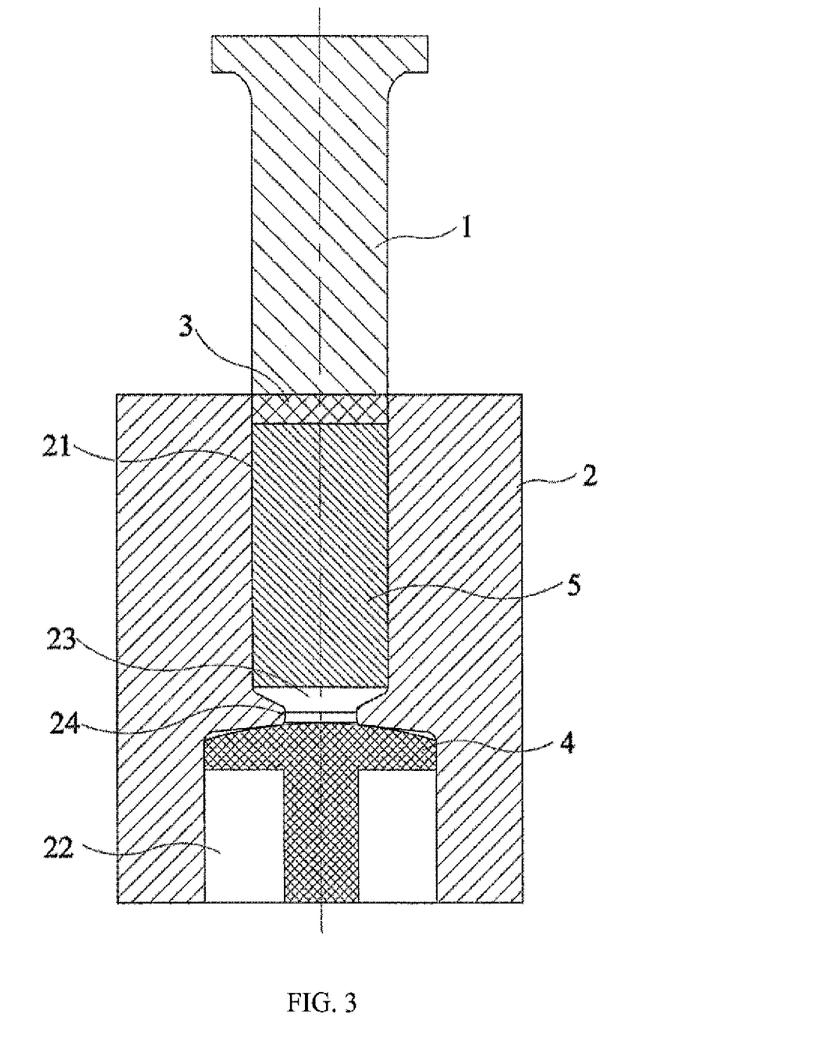
FIG. 3 is a structural diagram of the mold of the present disclosure before forming.
Figure 9:
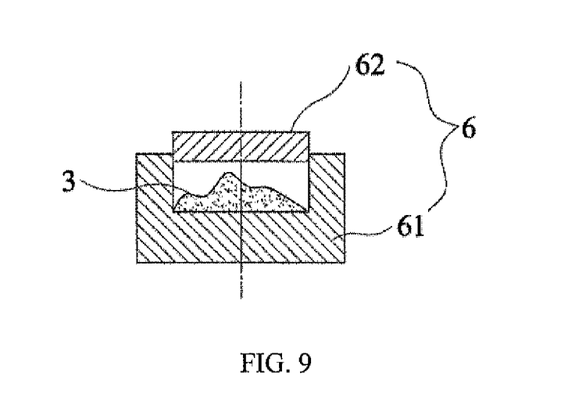
FIG. 9 is a schematic diagram of the structure shown that the powdered recoverable discard block of the present disclosure is placed into the extrusion restoration mold.
Figure 10:
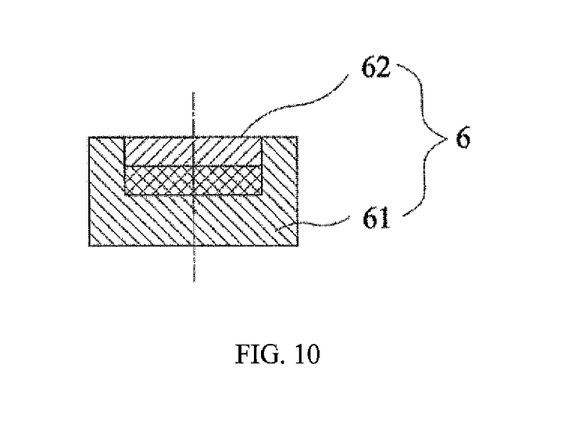
FIG. 10 is a schematic diagram of the structure shown that the recoverable discard block of the present disclosure is restored.

The present disclosure is a mold for preparing large-size rare earth magnesium alloy ingots with high-performance by short process severe plastic deformation, as shown in FIG. 3, which includes a male mold 1 installed on an upper workbench (not shown) of a press machine, a female mold 2 installed on a lower workbench (not shown) of the press machine, a recoverable discard block 3, a back pressure plate 4 connected with a pushing cylinder (not shown) of the press machine, and an extrusion restoration mold 6 (shown in FIGS. 9 and 10).

The female mold 2 is provided with an upper mold cavity 21 and a lower mold cavity 22. The upper mold cavity 21 and the lower mold cavity 22 are located on the same central axis, and the upper part of the upper mold cavity 21 is configured for placing blanks 5, the recoverable discard block 3 and the male mold 1. There is an extrusion deformation area 23 provided between the upper mold cavity 21 and the lower mold cavity 22. The lower part of the upper mold cavity 21 is inclined inward to form the extrusion deformation area 23 communicated with the lower mold cavity 22. The upper part of the lower mold cavity 22 is connected with the extrusion deformation area 23. The upper part of the lower mold cavity 22 is inclined to expand outward from top to bottom, so that the side part of the extrusion deformation area 23 forms an annular inner flange 24, and the formed multiple turning angles improve the plastic deformation degree. The back pressure plate 4 is T-shaped, and the upper part of the back pressure plate 4 is fitted in the lower mold cavity 22 to form a molding cavity between the upper part of the back pressure plate 4 and the lower mold cavity 22, and the lower part of the back pressure plate 4 is connected to the pushing cylinder of the press machine.

Figure 4:
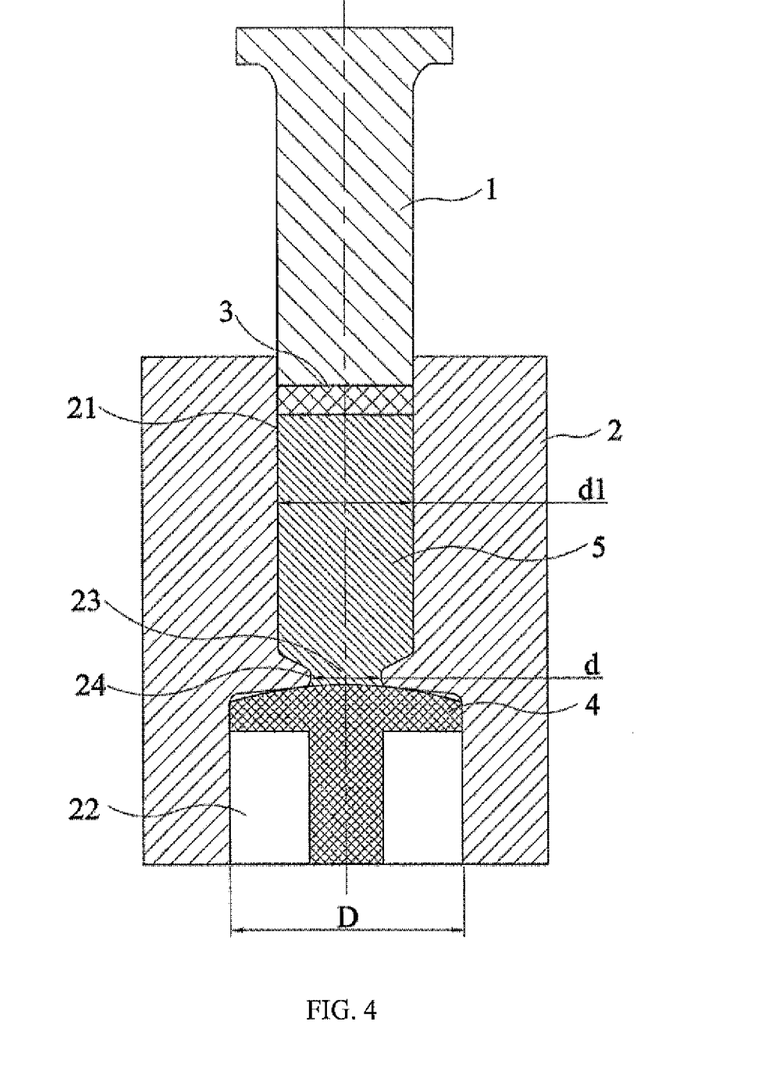
FIG. 4 is a structural diagram when the bottom of the blank of the mold of the present disclosure is in contact with the back pressure plate.

As shown in FIG. 4, the width of the blank 5 extruded by the extrusion deformation area 23 is d, and the width D of the lower mold cavity 22 is much larger than the width d1 of the upper mold cavity 21, so that severe plastic deformation ε can be realized $$\varepsilon = \varepsilon_1\left(2Ln\frac{d}{d_1}\right) + \varepsilon_2\left(2Ln\frac{D}{d}\right)$$

wherein, $\varepsilon_1$ is the strain at which the blank diameter changes from d1 to d, $\varepsilon_2$ is the strain at which the blank diameter changes from d to D.

Further, to achieve severe plastic deformation $\varepsilon_2$, it is necessary to design the upper surface of the back pressure plate 4 as an external convex structure, that is, the middle of the upper surface of the back pressure plate 4 is raised; In order to prevent tail shrinkage and counteract the friction that prevents metal flow during upsetting, thus the following formula is satisfied:

$$\frac{d}{4h} \cdot \frac{\cos\theta}{1 + \frac{d\mu}{2h}(1 - \sin^2\theta)} \leq 1$$

Figure 11:
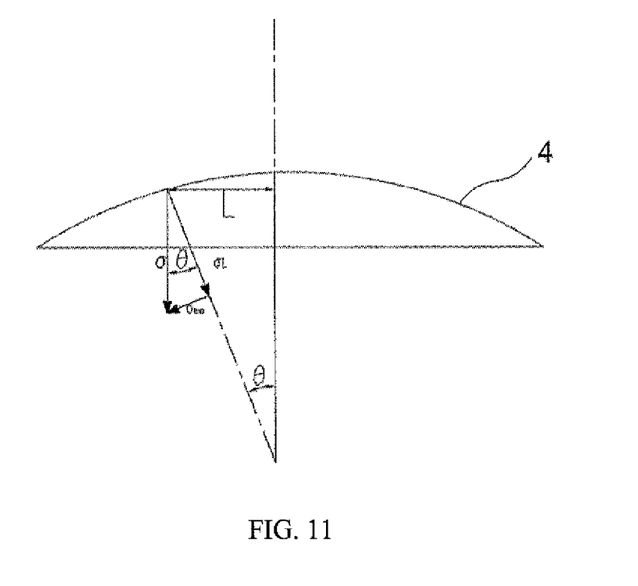
FIG. 11 is a schematic diagram of arc balance friction on the upper surface of the back pressure plate of the present disclosure.

As shown in FIG. 11, it is the stress decomposition state when the distance between the upsetting metal and the central axis is L. The contact surface of the upsetting metal with the back pressure plate 4 generates a frictional force that prevents the flow of the metal when the upsetting metal flows outward, and the back pressure plate is designed as a raised surface with a certain angle $\theta$ instead of a flat surface. The stress given by the outside can be decomposed into the stress $\sigma_Z$ in the normal direction of the contact surface and tangential stress $\sigma_{tan}$, and the tangential stress $\sigma_{tan}$ counteracts the friction. In addition, h is the height of upsetting extrusion blank, d is the diameter of upsetting extrusion blank, and $\mu$ is the friction coefficient. The height of the back pressure plate is greater than the height of the lower mold cavity of the female mold, and the mold can realize the preparation of large-size magnesium alloy ingots (diameter D>400, total strain $\varepsilon$>4).

Figure 6:
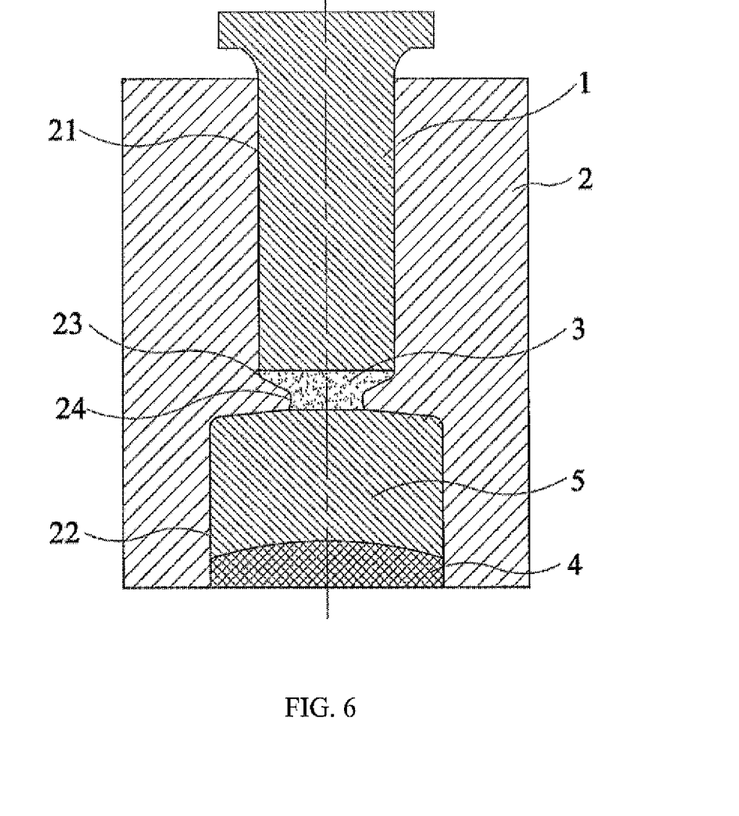
FIG. 6 is a structural diagram of the forming end of the mold of the present disclosure.
Figure 7:
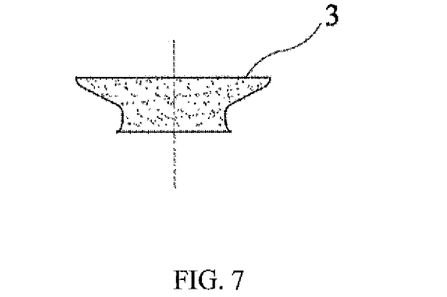
FIG. 7 is an enlarged schematic diagram shown that the fragmentation of the recoverable discard block after the upsetting extrusion process of the present disclosure.

As shown in FIG. 3, the recoverable discard block 3 is separated between the blank 5 and the male mold 1. The recoverable discard block 3 is made of deformable materials, which can be made of a mixture mixed with fluorite powder and graphite as the main raw materials. The recoverable discard block 3 is in a molten state at high temperature and is a brittle solid state at low temperature, and the recoverable discard block 3 is broken into solid powder when pressed in the extrusion deformation area 23 at low temperature. As shown in FIG. 6, the recoverable discard block 3 can be filled in the extrusion deformation area 23 and restored through deformation. As shown in FIG. 9 and FIG. 10, about the restored way, an extrusion restoration mold 6 is provided for the restoring, the extrusion restoration mold 6 includes a pressing box 61 and a pressing block 62, the pressing box 61 is provided with a groove, the recoverable discard block 3 is crushed into solid powder under pressure and placed in the groove, and the pressing block 62 presses the solid powder under high temperature, so that the solid powder is compressed and deformed back into recoverable discard block.

Figure 5:
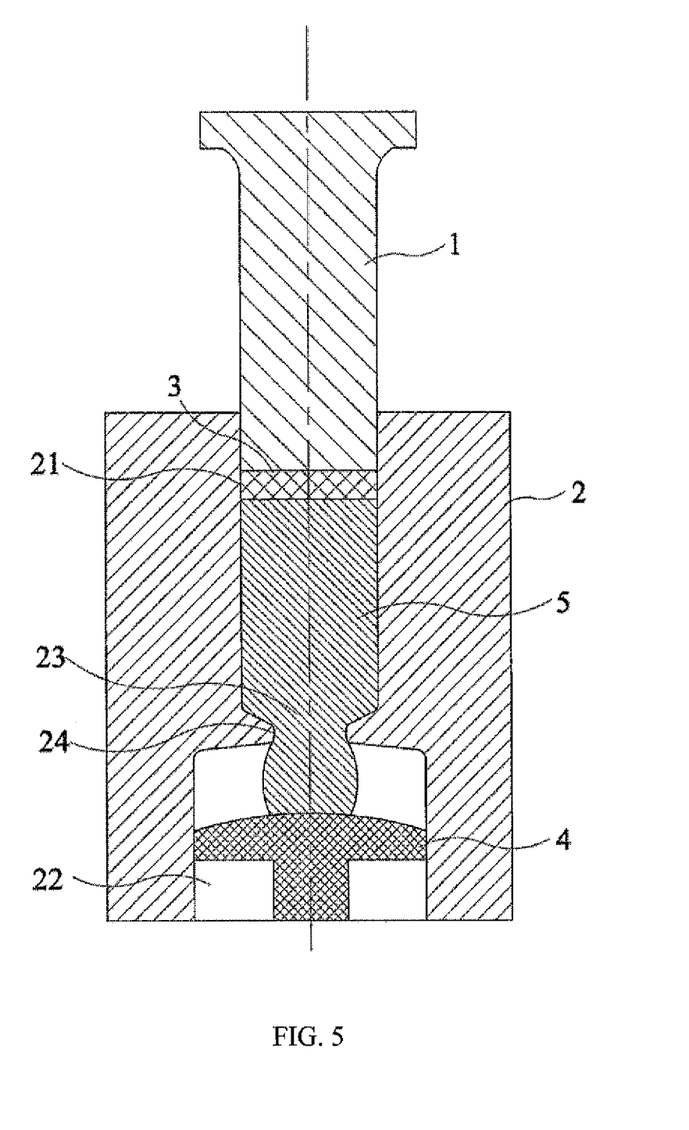
FIG. 5 is a structural diagram of the upsetting extrusion process of the mold of the present disclosure.
Figure 8:
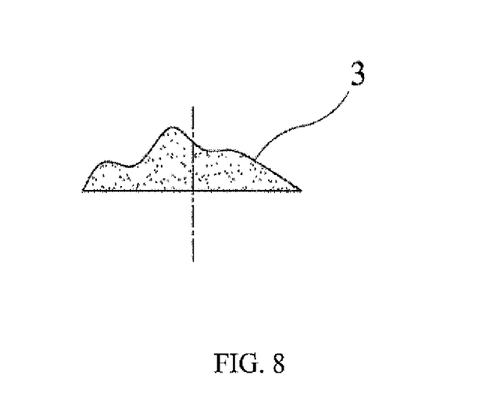
FIG. 8 is a schematic diagram of the structure for taking out the recoverable residue powder of the present disclosure.

The present disclosure further provides a method for preparing large-size rare earth magnesium alloy ingot without tail shrinkage by back pressure severe plastic deformation, and the method includes the following steps:

S1: providing cylindrical magnesium alloy bar;

S2: homogenizing the cylindrical magnesium alloy bar as cylinder blank 5;

S3: heating the cylinder blank 5 to the forming temperature and holding the temperature, and heating the preparation mold, back pressure plate 4, pressing box 61 and pressing block 62 above the experimental temperature and holding the temperature for half an hour;

S4: installing the preparation mold after preheating and heat preservation on the pressing machine, and evenly spraying organic graphite lubricant on the male mold 1 and the female mold 2;

S6: putting the cylinder blank 5 after homogenization and heat treatment into the upper mold cavity 21 of the male mold 2;

S7: placing the recoverable discard block 3 above the cylinder blank 5;

S8: in the initial stage of extrusion forming, adjusting the height of the back pressure plate 4 to the outlet of the extrusion deformation area 23 by the upward movement of the pushing cylinder. First, the pressing machine drives the male mold 1 to move downward and gradually extrudes the cylinder blank 5 into the extrusion deformation area 23. As shown in FIG. 4, the bottom of the cylinder blank 5 slowly deforms, contracts and fills the extrusion deformation area 23. As the male mold 1 continues to move downward, the bottom of the blank 5 contacts the upper surface of the back pressure plate 4. When the contact width is close to the size of the extruded part, as shown in FIG. 5, the back pressure plate 4 starts its downward return with the male mold 1. After the stroke of the male mold 1 is completed, as shown in FIG. 6, the recoverable discard block 3 fills the extrusion deformation area 23, and the upsetting deformation is completed. In this process, the back pressure plate 4 always gives an upward back pressure to blank 5;

S9: then, driving the back pressure plate 4 downward to remove from the lower part of the lower mold cavity 22 by the pushing cylinder, and the recoverable discard block 3 has been broken due to high pressure; then taking out the extruded cylinder blank 5 and the powder of the recoverable discard block 3 from the lower part of the lower mold cavity 22, putting the broken powder of recoverable discard block 3 into the heated pressing box 61, and pressing down with the pressing block 62 to restore the powder of the recoverable discard block 3 into a plate shape, so that the recoverable discard block 3 can be used next time.

The male mold 1 and the female mold 2 are connected to the upper and lower workbenches through fasteners. The method also includes S10: after the work is completed, molding the male mold 1 and the mold 2 together to perform a mold closing action, then loosening the fasteners, and then removing the preparation mold.

The description above is only a preferred embodiment of the present disclosure, not a limitation on the present application. All equivalent modification made based on the principle of the present application shall fall into the scope of the present application.

What is claimed is:

1. A method for preparing a rare earth magnesium alloy with ingots by severe plastic deformation, comprising:

S1: providing a cylindrical magnesium alloy bar;

S2: homogenizing the cylindrical magnesium alloy bar to form a cylinder blank;

S3: heating the cylinder blank to a forming temperature and holding the forming temperature, and heating a preparation mold above an experimental temperature and holding the experimental temperature for half an hour, wherein the preparation mold comprises a male mold installed on an upper workbench of a press machine, a female mold installed on a lower workbench of the press machine, a recoverable discard block and a back pressure plate connected with a pushing cylinder of the press machine, the female mold is provided with an upper mold cavity and a lower mold cavity, and an upper part of the upper mold cavity is configured for placing blanks, the recoverable discard block and the male mold, and a lower part of the upper mold cavity is inclined inward to form an extrusion deformation area communicated with the lower mold cavity; the recoverable discard block is separated between the cylinder blank and the male mold, the recoverable discard block is made of deformable material, and the recoverable discard block is configured to be deformed and filled in an extrusion deformation area and restored through deformation; an upper part of the back pressure plate is fitted in the lower mold cavity, so that a molding cavity is formed between the upper part of the back pressure plate and the lower mold cavity, and an upper surface of the back pressure plate is raised in a middle;

S4: installing the preparation mold after preheating and heat preservation on a pressing machine, and evenly spraying organic graphite lubricant on the male mold and the female mold;

S6: putting the cylinder blank after homogenization and heat treatment into the upper mold cavity;

S7: placing the recoverable discard block above the cylinder blank;

S8: adjusting a height of the back pressure plate to an outlet of the extrusion deformation area by an upward movement of the pushing cylinder in an initial stage of extrusion forming; wherein the pressing machine drives the male mold to move downward and gradually extrudes the cylinder blank into the extrusion deformation area; a bottom of the cylinder blank slowly deforms, contracts and fills the extrusion deformation area; as the male mold continues to move downward, the bottom of the cylinder blank contacts the upper surface of the back pressure plate; when a contact width is close to a size of an extruded part, the back pressure plate starts its downward return with the male mold; after a stroke of the male mold is completed, the recoverable discard block fills the extrusion deformation area, and an upsetting deformation is completed; in this process, the back pressure plate always gives an upward back pressure to the cylinder blank;

S9: driving the back pressure plate downward to remove from a lower part of the lower mold cavity by the pushing cylinder, wherein the recoverable discard block has been broken; taking out the cylinder blank after extruded and a powder of the recoverable discard block from the lower part of the lower mold cavity, and restoring the powder into a plate shape for use next time.

2. The method for preparing a rare earth magnesium alloy with ingots by severe plastic deformation according to claim 1, wherein the recoverable discard block is in a molten state at a first temperature, and the recoverable discard block is a brittle solid at a second temperature and is broken into solid powder when pressed in the extrusion deformation area; the first temperature is higher than the second temperature.

3. The method for preparing a rare earth magnesium alloy with ingots by severe plastic deformation according to claim 1, wherein the recoverable discard block is made of a mixture of fluorite powder and graphite.

4. The method for preparing a rare earth magnesium alloy with ingots by severe plastic deformation according to claim 1, wherein the preparation mold further comprises an extrusion restoration mold, the extrusion restoration mold comprises a pressing box and a pressing block, the pressing box is provided with a groove, the recoverable discard block is crushed into solid powder under pressure and placed in the groove, and the pressing block presses the solid powder to restore the solid powder into recoverable discard block under a first temperature.

5. The method for preparing a rare earth magnesium alloy with ingots by severe plastic deformation according to claim 1, wherein the male mold and the female mold are connected to the upper and lower workbenches through fasteners; the method further comprises S10: after a process for preparing rare the earth magnesium alloy with ingots by severe plastic deformation is completed, molding the male mold and the female mold together to perform a mold closing action, then loosening the fasteners, and then removing the preparation mold.

\* \* \* \* \*